United States Patent [19]
Fujita

[11] Patent Number: 5,319,794
[45] Date of Patent: Jun. 7, 1994

[54] DEVICE FOR HIGH-SPEED PROCESSING OF INFORMATION FRAMES

[75] Inventor: Hiroyuki Fujita, Kanagawa, Japan

[73] Assignee: Sony Corporation, Tokyo, Japan

[21] Appl. No.: 102,539

[22] Filed: Aug. 3, 1993

Related U.S. Application Data

[63] Continuation of Ser. No. 618,619, Nov. 27, 1990, abandoned.

[30] Foreign Application Priority Data

Nov. 30, 1989 [JP] Japan .................................. 1-311057
Nov. 30, 1989 [JP] Japan .................................. 1-311058

[51] Int. Cl.$^5$ .......................................... G06F 15/62
[52] U.S. Cl. ............................. 395/800; 364/DIG. 1
[58] Field of Search ................. 364/DIG. 1 MS File, 364/DIG. 2 MS File; 395/275, 100, 375, 600, 800

[56] References Cited

PUBLICATIONS

"TMS3401 User's Guide" Graphics Product by Texas Instruments (1986) pp. [1–5] to [1–9], [5–1] to [5–6] [5–23] to [5–29].
IEEE Transactions on Pattern Analysis and Machine Intelligence, vol. PAMI-3, No. 1, Jan. 1981, pp. 12–19 (Yachida).
IEEE Transactions on Electron Devices, vol. ED-32, No. 9, Sep. 1985, pp. 1784–1791 (Temma).
Proceedings of the International Conference on Systolic Arrays, May 25, 1988, pp. 621–630, (Hasebe et al.

Primary Examiner—Robert B. Harrell
Attorney, Agent, or Firm—Lewis H. Eslinger; Jay H. Maioli

[57] ABSTRACT

A signal processing device for performing a predetermined signal processing includes a first storage unit for storing a plurality of frames of information signals, a second storage unit for storing a plurality of data representing a plurality of signal processing programs, and a signal processing unit for performing signal processing on signals read from the first storage unit on the basis of the data representing the signal processing program read out from the second storage unit. The signal processing unit performs signal processing on all of the plural frames of signals stored in the first storage unit and causes the processed frames of signals to be restored in the first storage unit. The signal processing unit then performs signal processing on all of the plural frames of signals stored in the first storage unit on the basis of the second signal processing program read out from the second storage unit.

12 Claims, 2 Drawing Sheets

DEVICE FOR HIGH-SPEED PROCESSING OF INFORMATION FRAMES

This is a continuation of application Ser. No. 07/618,619, filed Nov. 27, 1990, now abandoned.

FIELD OF THE INVENTION

This invention relates to a signal processing device for processing input signals, such as input video signals, at an elevated processing speed. More particularly, it relates to a signal processing device for processing signals in accordance with a plurality of signal processing programs.

DESCRIPTION OF THE PRIOR ART

Recently, studies and practical utilization of the art of image processing are progressing briskly. The image processing is being performed for various purposes, such as for image conversion or measurement, image pattern recognition or image generation. Of these, image conversion consists of performing various operations on the input image to produce a processed image. These operations may include, for example, gradation compensation, point processing, proximity processing, geometrical processing, texturizing, filtering, two-dimensional conversion, line or contour extraction and area division. The operations may also include various combinations of the above mentioned operations with image enhancement and image restoration.

Such image processing is known from, for example, the UK Patent GB 2213621B.

As an example of the conventional signal processing device performing the image processing including image conversion, a device performing various operation on a still image is shown in FIG. 1.

The conventional signal processing device 1 shown in FIG. 1 is constituted by a hard disk 10 on which an image has been recorded, an external memory 15 in which a plurality of signal processing programs $\mu P_1$ to $\mu P_4$, that is microprograms, for image processing, are performed, a processing unit 20 for performing various operations or manipulations on signals of each image frame on the basis of the signal processing programs, and a control unit 25 for controlling these components. An internal memory 30 for storing the large capacity microprograms transmitted from the external memory 15 is provided in the processing unit 20.

With the above signal processing device 1, the memory for storing the microprograms has a hierarchical structure composed of the internal memory 30 and the external memory 15, such that a high speed large capacity memory is implemented by the hierarchical structure of the memories 30 and 15. That is, the external memory 15 is a large capacity memory in which a long or large scale original signal processing program is divided into several microprograms and stored in this divided state within the extent of the capacity of the internal memory 30. In the present embodiment, the external memory 15 is divided into four memory areas $M_1$ to $M_4$, in which the microprograms $\mu P_1$ to $\mu P_4$ divided from the original long signal processing program, are stored for performing respective signal processing operations. These microprograms $\mu P_1$ to $\mu P_4$ are transferred sequentially and severally to the internal memory 30 to execute the microprograms $\mu P_1$ to $\mu P_4$ sequentially by way of executing the original long signal processing program.

The operation of the image processing by the signal processing device shown in FIG. 1 is hereinafter explained.

The image signals corresponding to one image frame are taken out from the hard disk 10 so as to be transmitted to processor 35. Although not shown, a buffer memory capable of storing image signals of at least one image frame is contained within the processor 35 and signal processing is performed on the image signals stored in this buffer memory. In a data memory 40, tables for sine or cosine functions or coefficients necessary for signal processing performed in accordance with the microprograms $\mu P_1$ to $\mu P_4$ are stored. On starting the signal processing, the first microprogram $\mu P_1$ from the storage area $M_1$ of the external memory 15 is transferred to and stored in the internal memory 30 of the processing unit 20. In the processor 35, the one-frame image signals are processed on the basis of the microprogram $\mu P_1$ written in the internal memory 30. On termination of the processing of the microprogram $\mu P_1$, the microprogram $\mu P_2$ is transferred from the memory area $M_2$ of the external memory 15 into the internal memory 30 where it is stored in substitution for the microprogram $\mu P_1$. Then, in the processor 35, signal processing based on the microprogram $\mu P_2$ is consecutively performed on the 1-frame image previously processed in accordance with the microprogram $\mu P_1$. A similar sequence of the processing operations is performed on the microprogram $\mu P_3$ and $\mu P_4$. That is, on completion of the signal processing by each microprogram, the next microprogram is transferred to and stored in the internal memory 30 from the external memory 15 in substitution for the preceding microprogram, so that signal processing by each newly stored microprogram is executed sequentially. The 1-frame image signals for which the processing based on the last microprogram $\mu P_4$ has been terminated, that is the image signals on which the totality of the image processing has been terminated, are returned to, for example, the hard disk 10.

However, the conventional signal processing device 1 shown in FIG. 1 is adapted for processing still image signals, and hence is low in efficiency in the case of performing complicated processing on continuous moving images by way of performing an extremely long signal processing program, or performing complicated signal processing on a large number of still images. That is, with the signal processing device of FIG. 1, the time not relevant directly to the processing of the image signals in the processor 35 is increased. In other words, the so-called overhead is increased. Such overhead includes, for example, the time necessary for program switching, that is the time necessary for transferring the data of the microprogram $\mu P_1$ to $\mu P_4$ from the external memory 15 to the internal memory 30 and storing the data of the newly transmitted microprogram in substitution for those of the preceding microprograms in the course of the sequential processing of the image signals by these microprograms $\mu P_1$ to $\mu P_4$. With the above described signal processing device 1 of FIG. 1, the microprograms $\mu P_1$ to $\mu P_4$ are sequentially switched for each frame of consecutively supplied moving images (video images) for processing the video signals, so that the microprograms $\mu P_1$ to $\mu P_4$ need be transferred from the external memory 15 to the internal memory 30 a large number of times. In other words, the overhead is increased in its entirety because of the large number of times of switching the microprograms $\mu P_1$ to $\mu P_4$ in the internal memory 30, thus worsening the signal processing efficiency and protracting signal processing.

On the other hand, the hard disk 10 employed in the device shown in FIG. 1 is used in general for magnetically writing and reading signals on a magnetic recording medium, with the aid of a magnetic head, so that the data transfer between the hard disk 10 and the processor 35 is retarded to lower the signal processing efficiency of the conventional signal processing device during the processing of the consecutively transmitted video frames or a large number of still images.

SUMMARY OF THE INVENTION

It is an object of the present invention to provide a signal processing device adapted to perform complicated high-speed signal processing on image signals representing continuously moving images or a large number of still images.

For accomplishing the above object, the present invention provides a signal processing device for performing predetermined signal processing on an information signal comprising a first storage element for storing a plurality of frames of information signals a, second storage element for storing a plurality of data representing a plurality of signal processing programs, and a signal processor for performing signal processing on signals read out from the first storage element on the basis of data representing the signal processing programs read out from the second storage element. The signal processor performs signal processing on all of the signals of the plural frames stored in the first storage element on the basis of a first one of the signal processing programs read out from the second storage element, re-stores the processed signals of the plural frames in the first storage element and performs signal processing on all of the signals of the plural frames re-stored in the first storage element on the basis of a second one of the signal processing programs read out from the second storage element.

With the signal processing device of the present invention, since the initial values are directly written in data storage elements at the same time that the signal processing program is rewritten in the signal processing program storage element, initial value setting is performed before starting the execution of the signal processing program, so that the program for setting initial values in data storage or data memory may be eliminated to simplify the overall program. Since the time necessary for setting the initial values is not included in the processing time, the processing time in its entirety may be diminished.

DESCRIPTION OF THE PREFERRED EMBODIMENTS

Figure 1:
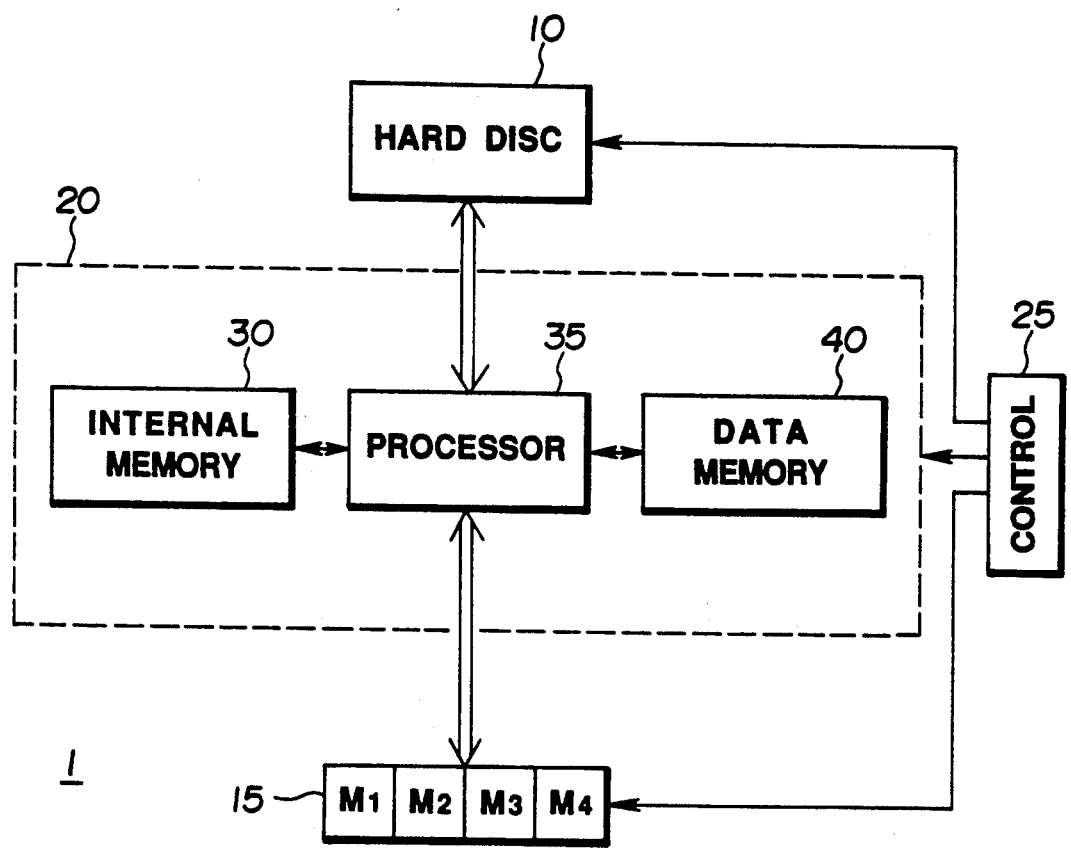
FIG. 1 is a block diagram showing a conventional signal processing program.

By referring to the drawings, a preferred embodiment of the present invention will be explained in detail.

Figure 2:
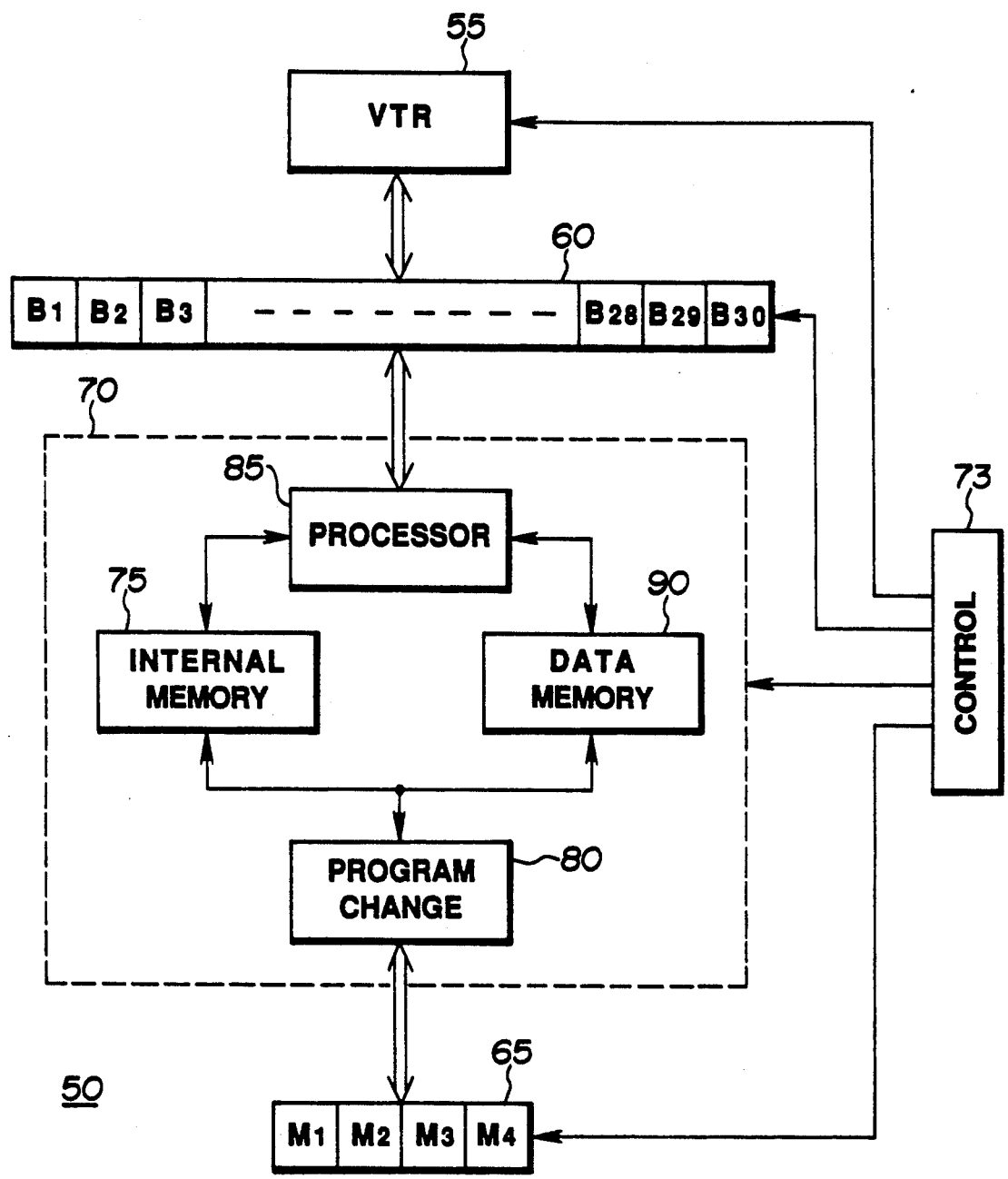
FIG. 2 is a block diagram showing an embodiment of the signal processing device according to the present invention.

FIG.2 shows a signal processing device 50 for processing the signals of consecutively transmitted moving images (video image) as input signals.

The signal processing device 50 of FIG. 2 is constituted by a video tape recorder (VTR) 55 for reproducing moving images consisting of a large number of frames from a magnetic tape for processing and recording the processed moving images, an image buffer 60 as storage for storing a plurality of frames of the video signals, an external memory 65 as program storage having memory areas $M_1$ to $M_4$ in which to store a plurality of microprograms $\mu P_1$ to $\mu P_4$ divided from a signal processing program adapted for performing complicated processing of signals stored in the image buffer 60, a processing unit 70, as input signal processor, for processing the signals stored in the image buffer 60 on the basis of the microprograms $\mu P_1$ to $\mu P_4$, and a control circuit 73 controlling the VTR 55, image buffer 60, processing unit 70 and the external memory 65. Within the processing unit 70, there is provided an internal memory 75 for storing the microprogram transmitted thereto from the external memory 65 by means of a program changing circuit 80. The image buffer 60 is a group of frame memories constituted by a high speed semiconductor memory adapted for storing, for example, 30 frames. Similar to the internal memory 30 and the external memory 15 shown in FIG. 1, each of the external memory 65 and the internal memory 75 of the signal processing device 50 of the present embodiment has a hierarchical memory structure, such that a high speed large capacity memory may be realized by the hierarchical memory structure of the internal memory 75 and the external memory 65. Thus a plurality of microprograms, divided from an original long program, are stored in the large capacity external memory 65. In the present embodiment, the external memory 65 is divided into four memory areas $M_1$ to $M_4$, in which the microprograms $\mu P_1$ to $\mu P_4$ for separately performing signal processing are stored, respectively. The microprograms $\mu P_1$ to $\mu P_4$ are transferred to and stored in this internal memory 75 operating at a high operating speed.

The video signals supplied from the image buffer 60 to the processing unit 70 are processed by a processor 85 in accordance with the microprograms stored in the internal memory 75. A data memory 90 stores tables for sine or cosine functions or coefficients necessary for signal processing operations executed in accordance with the microprograms $\mu P_1$ to $\mu P_4$.

The processing operation for the moving images performed in the signal processing device 50 of the present invention shown in FIG. 2 is hereinafter explained.

With the signal processing device of the present invention, the microprogram thin stored in the internal memory 75 is read out and the totality of the signals of the frames stored in the image buffer 60 are processed by the processor 85, after which the next microprogram is transferred from the external memory 65 to the internal memory 75 and the totality of the signals of the frames stored in the image buffer 60 are processed by the processor 85. As a concrete example of the image processing, the case of finding an area of a predetermined partial image on the screen, that is a partial image enclosed by a predetermined boundary line on the screen, is explained. In the present example, the microprogram $\mu P_1$ is a program for rendering the original image into the binary form, the microprogram $\mu P_2$ is a noise removing program and the microprogram $\mu P_3$ is an area-computing program for counting the number of pixels to find the area of the above mentioned partial image. The microprogram $\mu P_4$ is not used in the present embodiment.

From the VTR in which the reproducing system and the recording system operate in unison, consecutive video or image signals are outputted from the VTR 55 so as to be transmitted to the image buffer 60. The signals of the 30 frames of the images are stored in the image buffer 60 and are serially outputted in units of pixels, for example, from the first frame on, so as to be transmitted to the processor 85. The 30-frame signals are processed by the processor 85 before being returned to the same sites in the image buffer 60. The signal processing is performed on the basis of the three microprograms which are switched sequentially. After the totality of the 30-frame image signals has been processed by one of the microprograms, the image signals are processed by the next microprogram.

On starting the signal processing in its entirety, the microprogram $\mu P_1$ for rendering the original image into a binary form is transferred from the storage area $M_1$ of the external memory 65 to the internal memory 75 of the processing unit 70 so as to be stored in the internal memory 75 in substitution for the preceding microprogram. The microprogram $\mu P_1$ stored in the internal memory 75 is read out to the processor 85, and a predetermined signal processing, such as rendering the video data into the binary form, is performed. This predetermined signal processing is performed sequentially for the totality of the 30-frame video signals stored in the image buffer 60. By the signal processing of rendering the video data into the binary form, the pixel data having a video data value in excess of a certain threshold value is set to "1" while the other pixel data, that is the pixel data lower than the threshold value, is set to "0". The video signals, thus rendered into the binary form on the basis of the microprogram $\mu P_1$, are returned to the same sites in the image buffer 60 as indicated by the address location in the memory.

After the signal processing based on the first microprogram $\mu P_1$ has been performed on the totality of the 30-frame video signals, the microprogram $\mu P_1$ in the internal memory 75 is replaced by the noise-removing microprogram $\mu P_2$ transferred thereto from the storage area $M_2$ of the external memory 65. The 30-frame image signals, previously rendered into the binary form on the basis of the microprogram $\mu P_1$ and re-stored in the image buffer 60, are sequentially read out from the image buffer 60 so as to be transmitted to the processor 85. In the processor 85, the totality of the 30-frame video signals re-transmitted from the image buffer 60 is subjected to the noise-removing operation on the basis of the microprogram $\mu P_2$ stored in the internal memory 75. That is, the operation of removing noise components of the pixels having the video data value of "1" despite the fact that these pixels are not those constituting the predetermined image, is performed. The image signals thus freed of noises are sequentially returned to the image buffer 60. The microprogram $\mu P_3$ for finding the area is transmitted from the external memory 65 to the internal memory 75 in substitution for the preceding microprogram $\mu P_2$, and the operation of finding an area of the 30 frames is sequentially performed on the basis of the microprogram $\mu P_3$. That is, the operation of finding the area is performed by counting the number of pixels having the video data value of "1" within the extent of the full image which have been rendered into the binary form and freed of noises as described above. The image signals processed by the microprogram $\mu P_3$, that is the 30-frame image signals for which the image processing has been completed, are sequentially returned to the image buffer 60 so as to be returned subsequently or simultaneously to, for example, the recording system of the VTR 55.

After termination of the above described processing, the next image signals are sequentially transmitted from the reproducing system of the VTR 55 so that the next 30-frame image signals are stored in the image buffer 60. In this manner, the 30-frame image signals are transmitted from the VTR 55 in succession so as to be processed as described above. The moving images (video images) transmitted in succession from VTR 55 may be processed by the repetition of the above described sequences of operations.

The operating parts of the above described various components are controlled by the control circuit 73. That is, the reproduction and recording of the video data in VTR 55, i.e. the reproduction by the reproducing system and recording by the recording system of VTR 55, at intervals of 30 frames, the writing and readout of video signals in or from the image buffer 60 at intervals of 30 frames, signal processing in processor 85 or the writing and readout of the microprograms $\mu P_1$ to $\mu P_4$ between the external memory 65 and the internal memory 75, are controlled by control signals from the control circuit 73.

It is seen from above that the time not relevant directly to the processing of the video signals in the processing unit 70 is decreased, or in other words, the overhead is diminished. With the above described conventional signal processing device 1, data substitution or rewriting from the external memory 15 to the internal memory 30 in the course of sequential processing of the image or video signals based on the microprograms $\mu P_1$ to $\mu P_4$ is performed for each frame. Hence, when the 30 frames or 30 full images are processed by the above mentioned four microprograms $\mu P_1$ to $\mu P_4$, $30 \times 4 = 120$ times of rewriting is necessitated. With the signal processing device 50 of the present invention, the microprograms $\mu P_1$ to $\mu P_4$ are switched at every 30 frames for processing the image or video data, so rewriting only four times suffices.

In this manner, with the signal processing device 50 of the present invention, a complicated processing, such as signal processing based on a plurality of programs, may be performed on consecutive moving images efficiently and in a shorter time.

On the other hand, with the above described device, shown in FIG. 1, since the video data are magnetically written or read out on or from the hard disk 10, the data transfer speed between the hard disk 10 and the processing unit 20 is low. Conversely, with the present embodiment, since data transfer is performed by using the image buffer 60 constituted by the semiconductor memory having a generally higher transfer speed, and the 30-frame video data are transmitted between the VTR 55 and the processor 85 by means of the image buffer 60, the transfer speed is drastically increased, that is, transfer at the video rate becomes possible.

It is to be noted that the present invention is not limited to the above described embodiment. For example, a plurality of thirty still images, may be processed simultaneously. The input signals to be processed are not necessarily video signals.

The signal processing device includes means for storing input signals of a plurality of frames, means for processing the signals in accordance with the signal processing program, and means for storing the signal processing programs, and operates so that, after reading out a signal processing program and performing a processing on the totality of the signals of a plurality of the frames, the next signal processing program is read out and the signals are processed on the basis of the newly read out program. Thus, even in cases wherein the transmitted signals are video signals such as consecutive moving images or a plurality of still images, complicated processing may be performed on these signals efficiently and in a shorter time.

Meanwhile, with the above described conventional signal processing device 1, shown in FIG. 1, it is necessary in general to set initial values necessary for signal processing in the data memory 40 prior to starting the signal processing. Such setting of initial values includes, besides the operation of writing predetermined constants or tables of sine or cosine functions, the operation of clearing variables which are counted up sequentially during processing. Conventionally, programs for setting the initial values are written in a leading portion of each microprogram and the initial value setting program is executed by the processor 35 as soon as the program execution is started to write the predetermined constants in the data memory 40 or to clear the variables stored in the data memory 40. Subsequently, signal processing on the input image is performed. In this manner, it has been necessary to execute the program for setting the initial values in the data memory before executing the program for signal processing and, since the time for setting the initial values is included in the time of executing the program, the signal processing time in its entirety is inconveniently protracted.

It is therefore another object of the present invention to provide a signal processing device according to which the program for setting initial values for the data memory may be eliminated and the signal processing time may be correspondingly shortened.

A signal processing device 50 of the present invention shown in FIG. 2 is constituted by a processor 85, which is for processing input signals supplied from an image buffer 60 on the basis of a signal processing program, an internal memory 75 formed by a random access memory (RAM) which is program storage for storing the signal processing program transmitted from the external memory 65, a data memory 90 formed by a random access memory (RAM) which is data storage for storing data generated during signal processing by the processor 85, predetermined constants or variables or tables of sine and cosine functions, and a program changing circuit 1 for rewriting the signal processing program of the internal memory 75, writing the initial values (predetermined constants or tables of sine and cosine functions) in the data memory 90 or resetting the variables stored in the data memory.

In this manner, the above mentioned signal processing program is supplied from the external memory 65 to the signal processing device 50 of the present embodiment. The data stored in the external memory 65 are comprised of data indicating the program for signal processing and numerical data for setting the initial values. These program data and initial value setting data may be distinguished from each other at, for example, the program changing circuit 80. This may be realized by, for example, transmitting discrimination signals discriminating the program data from the initial value setting data from the control circuit 73 to the program change circuit 80 at the time of transmitting the respective data from the external memory 65 to the processing unit 70, or by affixing a flag for data discrimination at each predetermined unit of the respective data. When the input signals for processing the signals are the above mentioned image signals, the program for processing the image signals proves to be the above mentioned signal processing program.

The control device 73 superintends or manages the operation of the processing unit 70 and the external memory 65 and sequentially transmits each microprogram in the external memory 65 to the signal processing unit 70. In the present embodiment, the program changing circuit 80 discriminates if the data transmitted from the external memory 65 are the signal processing program data or the initial value setting data. If the transmitted data are those of the signal processing program, the program changing circuit 80 transmits the data to the internal memory 75 to rewrite the program and, if the data are those of the initial value setting data, the program changing circuit transmits the data to the data memory 90 to write the initial value setting data directly in the data memory 90. Thus the internal data of the internal memory 75 and the data memory 90 are directly rewritten by these program data and the initial value setting data.

Thus, in the present embodiment, writing the initial values into the data memory 90 and rewriting the program data of the signal processing program into the internal memory 75 by the program changing circuit 80 are performed simultaneously or as a continuous operation, so that the initial value setting in the data memory 90 has already been made at the time of starting the signal processing operation, and the time for setting the initial values is no longer included in the signal processing time.

With the above described signal processing device of the present embodiment, the writing of the initial values in the data memory 90 is performed simultaneously with the writing of the program data of the signal processing program into the internal memory 75, that is, as a continuous operation, so that the initial value setting program for the data memory 90 may be eliminated. Also, since the time necessary for executing the program for setting the initial values for data memory 90 is no longer included in the signal processing time, the signal processing time may be diminished in its entirety.

It is to be noted that the present invention is not limited to the above described embodiments, but many changes may be made within the scope of the present invention. For example, when the signal processing program data and the initial value setting data are transmitted from the external memory 65 to the processing unit 70, the control device 73 may designate whether the destination should be the internal memory 75 or the data memory 90.

What is claimed is:

1. A signal processing device for performing predetermined signal processing on information signals comprising a) first storage means for simultaneously storing a plurality of frames of said information signals as a group of frames, b) second storage means for storing a plurality of data representing a plurality of signal processing programs, c) signal transfer means for reading and storing said group of frames stored in said first storage means as frame signals, d) program transfer means for reading said plurality of data representing said plurality of signal processing programs, e) signal processing means for performing signal processing on said frame signals read from and re-stored to said first storage means according to said plurality of data representing selected ones of said plurality of signal processing programs read from said second storage means, and f) a control device for managing the operation of said signal processing means, said first storage means, said second storage means and said program transfer means such that said signal processing means performs signal processing on all of said frame signals from said group of frames according to one of said plurality of signal processing programs before said signal processing means performs signal processing on all of said frame signals according to another of said plurality of signal processing programs read from said second storage means.

2. The signal processing device according to claim 1, wherein said signal processing means include a data memory for storing data used by said signal processing means when performing signal processing on said frame signals according to one of said plurality of signal processing programs from said second storage means.

3. The signal processing device according to claim 2, wherein said data stored in said data memory is a coefficient for said signal processing.

4. The signal processing device according to claim 1, wherein said information signals are image signals.

5. The signal processing device according to claim 1, further comprising
a VTR for reproducing said information signals from a magnetic tape and supplying said information signals to said first storage means under control of said control device, said VTR recording said information signals supplied from said first storage means after signal processing thereof.

6. The signal processing device according to claim 1, wherein said plurality of signal processing programs in their entirety constitute a program for performing said predetermined signal processing on said information signals.

7. The signal processing device according to claim 1, wherein said signal processing means include an internal memory for sequentially and severally storing said plurality of data representing said plurality of signal processing programs stored in said second storage means.

8. The signal processing device according to claim 1, wherein each of said plurality of signal processing programs is a microprogram for performing a plurality of predetermined signal processing operations.

9. A signal processing device for performing predetermined signal processing on information signals comprising a) first storage means for storing said information signals as a group of data units, b) second storage means for storing data representing a signal processing program and for storing initial data for use in said signal processing in accordance with said signal processing program, c) third storage means for storing data representing said signal processing program read from said second storage means, d) fourth storage means for storing said initial data read from said second storage means, e) program change means for reading said data representing said signal processing program and said initial data from said second storage means and for allocating said data representing said signal processing program and said initial data to said third storage means and said fourth storage means, respectively, and f) signal processing means for performing signal processing on a complete group of said data units stored in said first storage means according to said data representing said signal processing program stored in said third storage means and said initial data stored in said fourth storage means, and g) a control device for managing the operation of said signal processing means, said first storage means, said second storage means, said third storage means, said fourth storage means and said program transfer means.

10. The signal processing device according to claim 9, wherein said initial data is a coefficient for said signal processing.

11. The signal processing device according to claim 9, wherein said initial data is a conversion table for predetermined functions.

12. A signal processing device for performing predetermined signal processing on information signals comprising a) first storage means for storing a plurality of frames of said information signals forming a group of frames, b) second storage means for storing a plurality of data representing a plurality of signal processing programs and for storing a plurality of initial data for use in a plurality of signal processing operations in accordance with said plurality of signal processing programs, c) third storage means for storing data representing selected ones of said plurality of signal processing programs read from said second storage means, d) fourth storage means for storing selected ones of said plurality of initial data read from said second storage means, e) program change means for reading said plurality of data representing said plurality of signal processing programs and for reading said plurality of initial data from said second storage means and for allocating said data representing said selected ones of said plurality of signal processing programs and said selected ones of said plurality of initial data to said third storage means and said fourth storage means, respectively, and f) signal processing means for performing signal processing on said group of frames read from and re-stored to said first storage means according to said data representing said selected ones of said plurality of signal processing programs stored in said third storage means and said selected ones of said plurality of initial data stored in said fourth storage means, and g) a control device for managing the operation of said signal processing means, said first storage means, said second storage means, said third storage means, said fourth storage means and said program transfer means such that said signal processing means performs signal processing on all of said frames in said group of frames according to data representing one of said selected ones of said plurality of signal processing programs stored in said third storage means and further selected ones of said selected ones of said plurality of initial data stored in said fourth storage means before said signal processing means performs signal processing on all of said frames in said group of frames according to data representing another of said selected ones of said plurality of signal processing programs and other further selected ones of said selected ones of said initial data read from said second storage means and allocated by said program change means to said third storage means and said fourth storage means, respectively.

* * * * *